April 7, 1959 F. R. L. DALEY, JR 2,880,744
HOUSING VENT
Filed April 19, 1957
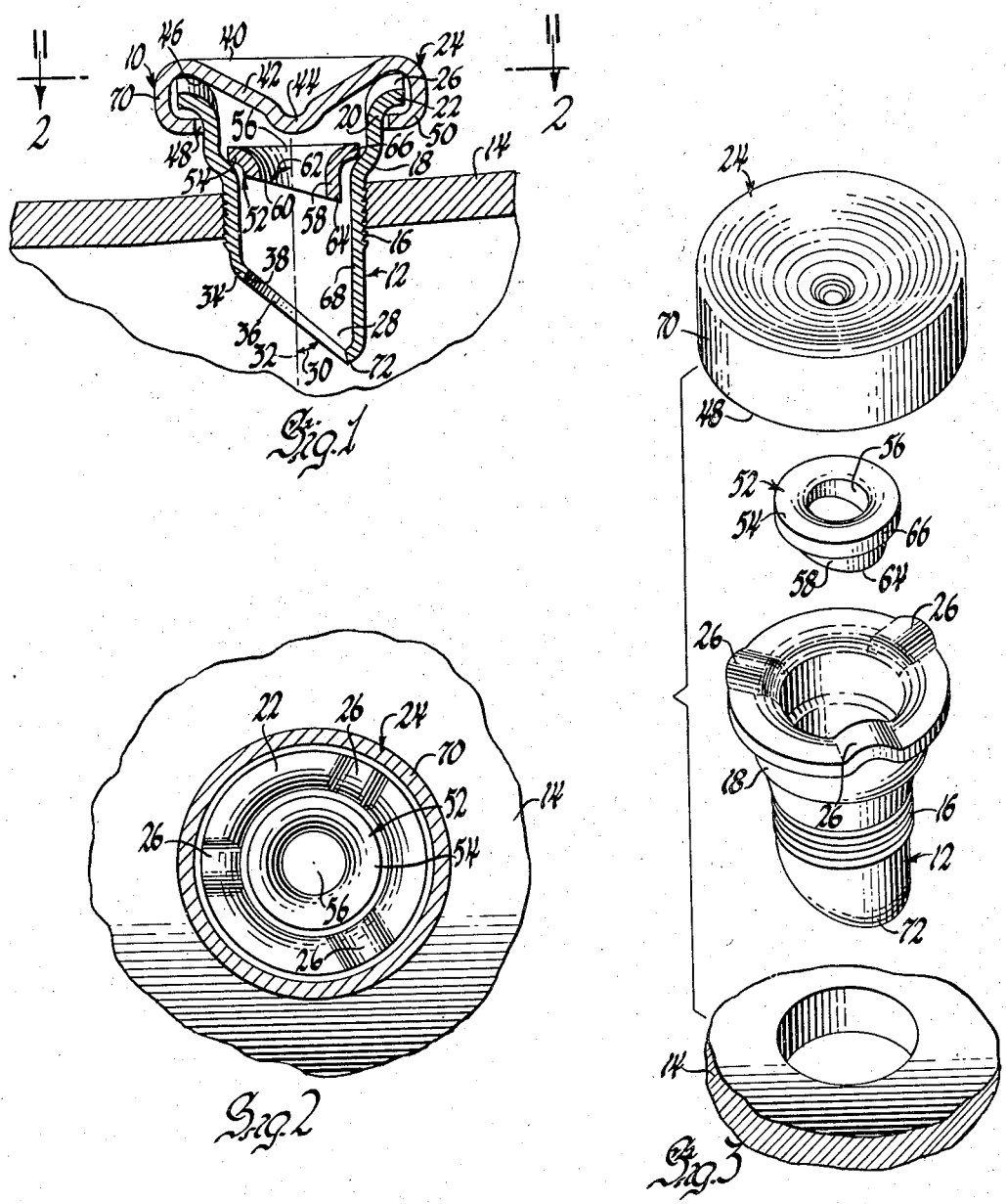
INVENTOR.
Frank R. L. Daley Jr.
BY
ATTORNEY United States Patent Office 2,880,744
Patented Apr. 7, 1959

2,880,744
HOUSING VENT

Frank R. L. Daley, Jr., Fenton, Mich., assignor to General Motors Corporation, Detroit, Mich., a corporation of Delaware Application April 19, 1957, Serial No. 653,848

7 Claims. (Cl. 137—197)

The invention relates to a housing vent mechanism and more particularly to vent mechanisms which permit the escape of expanding air from the housing while preventing the escape of oil or other lubricant particles. It is particularly adapted to be used with housings having rotatable elements contained therein. Such housings include rear axle housings for automotive vehicles, transmission housings, and housings for gear components having other applications.

When such mechanical trains are operated within a housing, a certain amount of heat is generated and this heat tends to increase the pressure of the atmosphere within the housing. This pressure is especially detrimental to oil seals. The components within the housing are also usually lubricated by providing a continuous flow of lubricating oil or using a splash system of lubrication. Lubricants commonly used tend to form foam and bubbles when the components are in operation. Among other reasons, this is due to high surface tension characteristics of the lubricants used. As the pressure is increased within the housing due to heat and other causes, the lubricant foam and bubbles attempt to escape through any vent which may be provided. These bubbles will form even over a relatively large aperture because of the high surface tension characteristics and thus plug the free passage of the expanding air. The bubbles are then pushed upward through the vent and burst. When this happens, minute droplets of lubricant are splattered in all directions and a considerable percentage of the droplets is carried out of the vent opening with the escaping air. Other droplets are thrown directly out the opening when the bubbles burst. This causes an accretion of lubricant on the outside of the vent and the housing in the area adjacent the vent. This accumulation is unsightly and, if allowed to continue, the lubricant will begin to drip off the housing. The floor under the housing, particularly garage floors under automotive vehicle axle and transmission housings, is then contaminated with lubricant.

Vents previously proposed have not satisfactorily solved the problem of permitting low pressure and low velocity venting while preventing the escape of lubricant particles. Vents incorporating the invention include a system to aid in breaking the bubbles before they reach the top of the vent by providing two or three points in the direction of vented air flow at which the lubricant bubbles can burst. Lubricant particles from which the bubbles are formed are also directed back into the housing. When fixed vent baffles or caps are used, the passages therethrough tend to become plugged by dirt, dust, and lubricant residue. The likelihood of a vent becoming plugged is materially decreased by providing a loosely mounted baffle disk and a loosely secured vent cap.

The vent now proposed effectively limits the escape of lubricant particles. It may be positioned at any desirable point on a housing, even though the desirable position point may require a flat compact unit, since it extends a relatively short distance above the surface of the housing.

In the drawing:

Figure 1 is a cross section view of a vent embodying the invention with parts broken away and in section;

Figure 2 is a cross section view of the vent of Figure 1 taken in the direction of arrows 2—2; and Figure 3 is an exploded view of the vent of Figure 1 showing the vent elements prior to assembly.

The vent 10 includes a vent body 12 which may be extruded or otherwise formed from a tube. The surface of the vent body which is engaged with the housing 14 is provided with serrations 16 to aid in holding the vent body in position. Body 12 may be expanded outwardly to form shoulder 18 immediately above serrations 16. The upper end 20 of the vent body is preferably outwardly flared at 22 to provide a mount for vent cover 24. Flared end 22 may be upset at a plurality of circumferentially spaced points to provide lands 26. The inner end 28 of the vent body 12 may terminate at a slash angle 30 which is obliquely disposed to vent axis 32. The portion 34 of the vent body defining aperture 36 is preferably inwardly disposed to form an internal flange 38 extending circumferentially in the plane of the angular end 28. Vent cover 24 is preferably formed as a cylinder with one end 40 being closed to provide a closed vent cover. The closed end of the cover cylinder preferably extends axially inward and may be formed with a symmetrical section 42. Section 42 may be conical with the apex of the cone being formed as a center dimple 44 which also extends inwardly. When assembling the vent, cover 24 is placed over the flare 22 and the cover inner surface 46 adjacent flare 22 is engageable with the upper surfaces of lands 26. The open end 48 of cover 24 is loosely crimped at 50 to extend around the flare 22 and retain the cover in position while permitting it to be moved a limited amount in both axial and radial directions.

A loosely mounted baffle disk 52 is provided within vent body 12 and is positioned intermediate shoulder 18 and cover 24. Disk 52 is preferably formed with an annular portion 54 and a center aperture 56 defined by a relatively short axially extending tubular wall 58. Wall 58 may be integrally formed with the disk annular portion 54. The end 60 of the wall 58 preferably terminates at a slash angle 62 relative to the vent axis 32 to provide a drip point 64 at the lower edge of wall 58. Baffle disk 52 is permitted limited axial movement between shoulder 18 and cover 24 and is provided with circumferential clearance between the outer edge 66 of the disk portion 42 and the inner surface 68 of vent body 12 intermediate shoulder 18 and upper end 20. The disk 52 may rest on shoulder 18 when no forces tend to position it otherwise.

When the mechanical components contained within housing 14 are in operation, atmospheric pressure within the housing tends to increase due to heat generated by friction between the components. The vent 10 will permit the atmosphere within the housing to expand and escape as necessary to prevent increase in housing internal pressure. The expanding atmosphere passes through aperture 36 of vent body 12 and aperture 56 of baffle disk 52, then upwardly and outwardly over the flare 22 of the vent body. Since lands 26 hold the vent cap 24 out of contact with the greater portion of the inner surface of flare 22, the atmosphere being expelled passes between the conical portion 42 of the cover 24 and flare 22. The cylindrical wall 70 of cover 24 is sufficiently larger internally than the diameter of flare 22 to allow tortuous low velocitiy passage of the vented air around the circumferential end of the flare. The cap 24, having been loosely crimped about the flare, also provides free passage of the vented air around the cap end 48. When a lubricant bubble is formed within vent body 12 adjacent aperture 36, the escaping air tends to carry the bubble with it in its upward movement. The bubble will engage the end 60 of baffle disk 52 and will probably burst at this point. Should the bubble reform as a film between the vent body 12 and the disk outer edge 66, movement of the baffle disk within the vent body will break the film at this point. This movement is permitted since the disk is loosely mounted within the body and under normal operating conditions will be erratically bounced between shoulder 18 and cap 24. Should a lubricant bubble tend to reform at the upper end of disk aperture 56, the outgoing air will cause the bubble to extend upwardly until it contacts the inner surface of cover dimple 44. The bubble may then be broken at this point. All of the points at which bubbles may be broken are below and out of direct line with the vent openings formed by flare 22 and cap 24. The lubricant particles resulting from the bursting of the bubbles will therefore spatter outwardly to the inner surface 68 of the body 12 and will collect of this surface. When sufficient lubricant is so collected it will run down the surface 68 to the lower portion 72 of the internal flange 38 and will drip from this point. Any lubricant particles collecting on the baffle disk 52 will form droplets at the baffle drip point 64 and will drip through aperture 36 and into the interior of the housing 14. Any droplets forming on the inner surface of cap 24 will flow downwardly along the inner surface of the conical section 42 and will drip from the lowest point of dimple 44, fall through baffle aperture 56 and body aperture 36 and then into the interior of housing 14. Should the lubricant falling from either upper drip point contact a lower surface, it will flow along that surface to the next lower drip point. Three drip points are thus provided which aid in returning lubricant droplets to the interior of the housing rather than permitting the lubricant droplets to pass through the vent. By providing lands 26, a large circumferenial cross section area through which the vented air passes is obtained, thus obtaining low velocity flow of the vented air. The low velocity air is less likely to carry suspended lubricant droplets to the outer atmosphere from the interior of the housing and also permits lubricant counterflow through the vent. This larger area also decreases the likelihood that the vent will become plugged by dust, dirt, and oil particles since a relatively large area would have to be plugged to obtain an appreciable decrease in vent flow.

The vent permits economical manufacture since it may be readily extruded or otherwise formed from a tubular section and from stamped sheet metal blanks. Since the components of the vent are loosely assembled, no close tolerances between these components need be maintained. A vent which is readily installed in a housing is thus provided which greatly increases the vent operational efficiency while permitting full venting of air within the housing at a low velociety. The vent may be readily installed in any desirable position even when there is a small clearance between the housing and other structural portions of the vehicle or other machines in which the housing may be incorporated.

What is claimed is:

1. A vent including a tubular body having one end outwardly flared and the other end terminating at an angle to the body axis and a shoulder formed intermediate said ends, an annular baffle loosely positioned within said body intermediate said shoulder and said flared end, a cover for said flared end, said cover having a circumferentially extending flange and a central portion extending inwardly toward said annular baffle, said flange being formed to loosely retain said cover on said flared end, said flared end being upset as a plurality of points whereby said cover is held in axially spaced relationship to the plane of said flared end.

2. In combination with a housing containing lubricant and an expandible atmosphere therein, a vent for said housing for venting said atmosphere while retaining said lubricant in said housing, said vent including a body, a cap loosely secured to said body, first means loosely retained within said body for restricting outward passage of said lubricant, and means formed on said cap for further restricting outward passage of said lubricant.

3. A vent for permitting passage of a first fluid and restricting passage of a second fluid, said second fluid tending to form bubbles within said vent, said vent including a body having one end angularly formed to provide a first drip point and another end outwardly flared, annular baffle means loosely mounted within said body and having a lower portion angularly formed to provide a second drip point, and a cover loosely secured to said body on said flared end.

4. In combination with a vent for permitting escape of expanding air within a housing, a vent cap having a closed end and a cylindrical side adapted to be deformed to loosely secure said cap on said vent, said cap closed end having a section extending inwardly within said housing and formed symmetrically about the longitudinal axis of said housing and a dimple axially aligned with said cap symmetrical section, said symmetrical section terminally connecting with said dimple.

5. In combination with a housing vent mechanism for permitting passage of air and restricting passage of lubricant, a baffle loosely mounted within said mechanism for movement relative thereto, said baffle having an annular disk portion and a coaxially extending tube portion, said tube portion terminating at the end opposite said disk portion at a slash angle whereby a lubricant drip point is formed.

6. In combination with a housing, a vent mechanism having a body, an annular baffle disk loosely mounted within said body, and a cap cover loosely secured to said body and having a dimple formed therein extending inwardly toward said annular baffle disk, said cap and disk and said body being each formed to provide lubricant drip points for returning lubricant into said housing.

7. A vent for controlling flow of at least two diverse fluids, said vent including a body, a baffle disk loosely supported in said body and a vent cap loosely secured to said body, said vent providing a low velocity tortuous flow passage whereby one of said fluids is permitted to escape and another of said fluids is trapped within said vent body and permitted to flow in a direction counter to the direction of flow of said first fluid.

References Cited in the file of this patent

UNITED STATES PATENTS

| 2,113,454 | Mitchell | Apr. 5, 1938 |
| 2,682,568 | Stofen | June 29, 1954 |

FOREIGN PATENTS

| 492,994 | Canada | May 19, 1953 |

UNITED STATES PATENT OFFICE
CERTIFICATE OF CORRECTION

Patent No. 2,880,744                                              April 7, 1959

Frank R. L. Daley, Jr.

It is hereby certified that error appears in the printed specification of the above numbered patent requiring correction and that the said Letters Patent should read as corrected below.

Column 3, line 19, for "collect of" read — collect on —; column 4, line 5, for "as a plurality" read — at a plurality —.

Signed and sealed this 4th day of August 1959.

(SEAL)
Attest:

KARL H. AXLINE                                                   ROBERT C. WATSON
Attesting Officer                                              Commissioner of Patents